Aug. 16, 1955 — K. R. LARSON — 2,715,333
TORQUE MEASURING WRENCHES
Filed Feb. 16, 1951 — 2 Sheets-Sheet 1
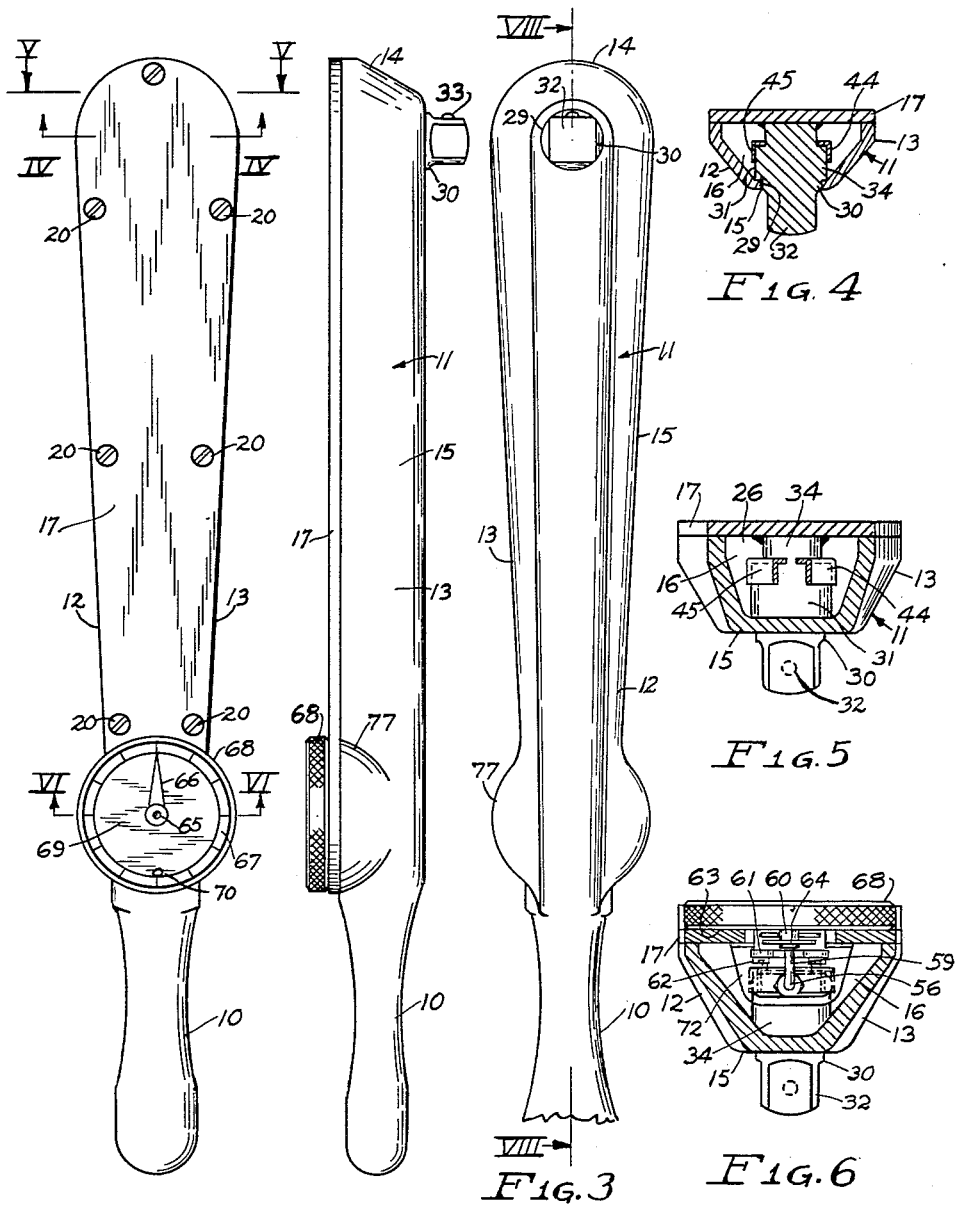
INVENTOR
KENNETH R. LARSON
BY
ATTORNEY

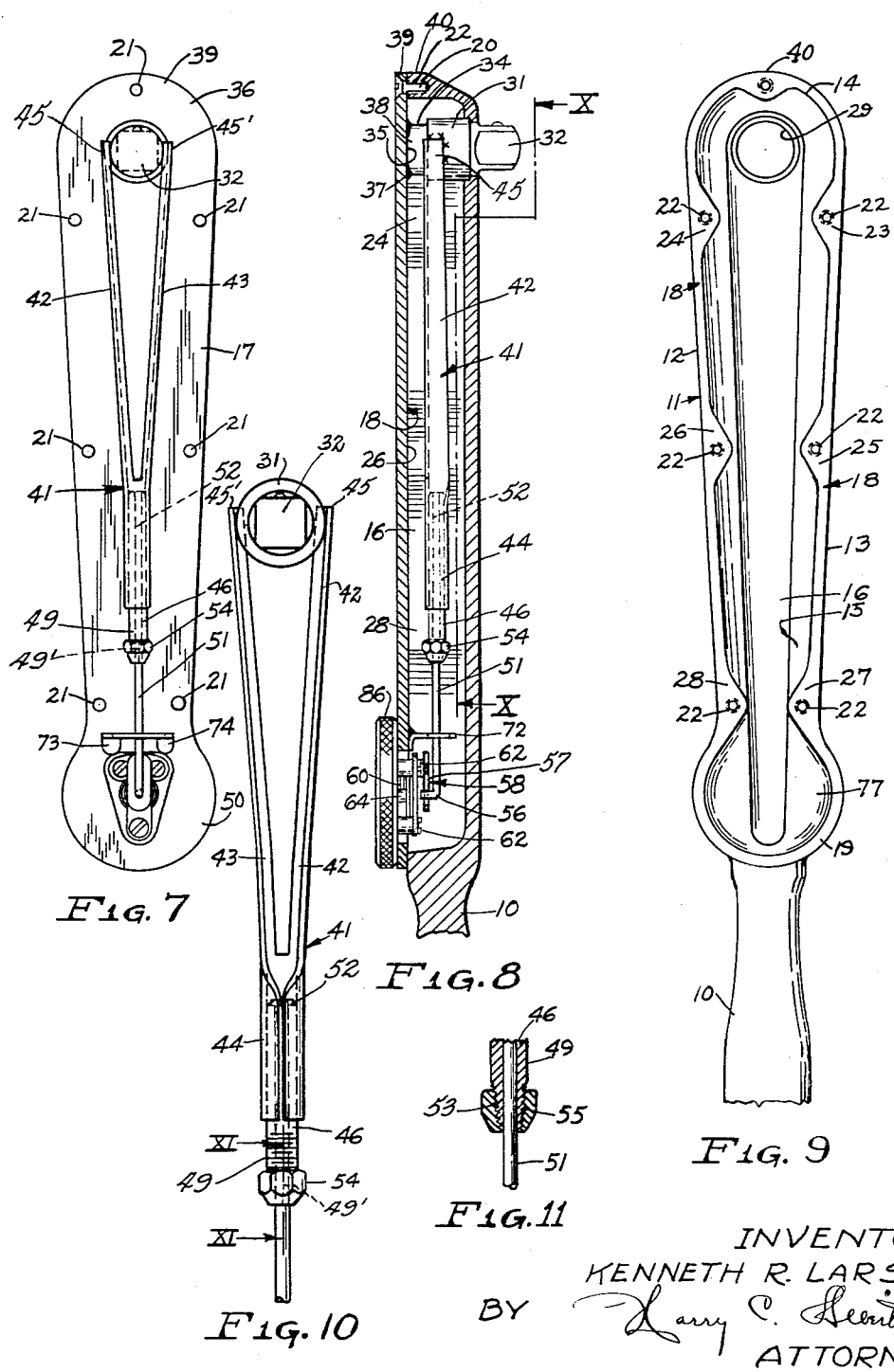

United States Patent Office 2,715,333
Patented Aug. 16, 1955

2,715,333

TORQUE MEASURING WRENCHES

Kenneth R. Larson, Des Plaines, Ill., assignor to Snap-On Tools Corporation, Kenosha, Wis., a corporation of Delaware Application February 16, 1951, Serial No. 211,391

6 Claims. (Cl. 73—139)

This invention relates to turning devices and more particularly to torque measuring wrenches of the type disclosed in United States Letters Patent No. 2,312,104 and No. 2,314,623, although certain features thereof may be employed with equal advantage for other purposes.

It contemplates more especially the provision of a simple, dependable, accurate and compact torque measuring wrench that accurately designates the force applied in nut turning and similar movements under all conditions.

Most torque wrenches measure the flex in a beam which resists the turning force of a wrench in order to measure the amount of torque or force applied in nut turning and similar operations. Then, too, the amount of torque has been measured by determining the degree of twist in a shank or shaft. While some torque wrenches have embodied this principle, there has been no appreciable effort made to adapt such to commercial wrench structures of the conventional handle or lever arm type.

The desirability of utilizing the degree of twist in the shank or shaft as the measuring expedient in nut turning and similar operations, has not been resorted to with the utmost advantage from the standpoint of translating the degree of twist to an indicator at a point of maximum displacement so that accurate measurements can be recorded by reducing the error factor to a minimum.

The importance of accuracy in torque wrenches cannot be over-emphasized, and the degree of accuracy depends largely upon the elimination of or substantial reduction in friction, lag and free-play between relatively moving parts. This is also important in torque wrenches that embody the principle of flexing a torque resisting beam to provide the desired reading; however, better results have been found possible in torsion type wrenches embodying teachings of the present invention.

In accordance with the teachings of the present invention, the torsion measuring principle has been embodied in the conventional type lever-arm wrench with minimum friction, lag, free-play, and maximum translation of the relative twist of the load carrying member. Torque measurements are possible, therefore, with a negligible error factor and nut turning operations are accurately measured under all conditions and capacities irrespective of the position of applied force along the lever-arm for effecting the turning operation.

One object of the present invention is to simplify the construction and improve the operation of devices of the character mentioned.

Another object is to provide a simple and compact torque measuring wrench of the lever-arm type that is accurate and dependable in operation and will not vary in its readings irrespective of the position of use or application for nut turning.

Still another object is to provide a torque measuring turning tool having improved rigid and non-flexing torsion translating means associated therewith for measuring the torque applied in the turning operation.

A further object is to provide a turning tool with a shank subjected to twist for operating measuring instrumentalities with a translated twist effect and having improved torsion translating means for accuracy and dependability.

A still further object is to provide a torque wrench with a turning shank having an improved rigid torsion translating and torque indicating rod extending therefrom for operative connection to measuring instrumentalities at a point of accentuated displacement.

Still a further object is to provide a wrench having a rigid casing element for attachment of a turning shank subjected to turning movement to provide a calibrated twist therein through the medium of a light, rigid, and furcated shank embracing rod connected to measuring instrumentalities at a point of greatest displacement responsive to torsional shank stresses and strains.

Other objects and advantages will appear from the following description of an illustrative embodiment of the present invention.

In the drawings:

Figure 1 is a plan view of a wrench embodying features of the present invention.

Figure 2 is a side view in elevation of the wrench shown in Figure 1.

Figure 3 is a bottom plan view of the wrench shown in Figure 1, part of the handle being broken away for convenience.

Figure 4 is a sectional view taken substantially along line IV—IV of Figure 1.

Figure 5 is a sectional view taken substantially along line V—V of Figure 1.

Figure 6 is a sectional view taken substantially along line VI—VI of Figure 1.

Figure 7 is a plan view of an underside of a casing cover plate and its assembled instrumentalities.

Figure 8 is a sectional view taken substantially along line VIII—VIII of Figure 3.

Figure 9 is a top view of the wrench shown in Figure 8 with the casing cover plate removed to illustrate the inner shape thereof.

Figure 10 is a bottom plan view of the torsion shank with the furcated torque translating arm and rod operatively disposed between the shank and measuring instrumentalities.

Figure 11 is a fragmentary sectional view taken substantially along line XI—XI of Figure 10.

The structure selected for illustration comprises a solid handle member 10 of standard construction having an elongated chambered wrench shank or body 11 cast or otherwise shaped to present inclined side walls 12 and 13 terminating in a semi-circular top or head extremity 14. The handle 10 with its chambered body 11 is preferably though not essentially cast from an aluminum alloy so as to possess the desired strength and lightness for convenience and manipulation in nut turning as will appear more fully hereinafter. It will be observed that the handle shank or body 11 consists of the inclined side walls 12—13 which converge in the direction of the handle 10 and also toward the bottom wall 15 formed integral therewith to define an elongated chambered interior 16. It should be noted that, in this instance, the side walls 12—13 not only converge toward the handle 10 (Figures 1 and 9) but also toward the bottom 15 (Figures 3 and 9) to define a compact and well balanced casing or body 11.

The body or casing shank 11 is, in this instance, covered by a rigid steel plate 17 that is shaped to conform with the configuration of the peripherally flanged open side 18 opposite the bottom wall 15 to confront therewith and serve as a complement thereof. The lower or handle extremity 19 of the chamber 16 is of the same general size and semi-circular configuration as the head extremity 14. The peripherally flanged open edge 18 of the casing 11 extends around the side walls 12—13 and their semi-circular head and handle extremities 14 and 19. The rigid face or cover plate 17 is shaped to correspond with the flanged open edge 18 including its upper and lower semi-circular head and handle extremities 14 and 19 to serve as an enclosure therefor, and a rigid turning arm to which the measuring instrumentalities are attached as will appear more fully hereinafter.

A plurality of threaded screw fasteners 20 project through apertures 21 in the rigid cover plate 17 to engage correspondingly threaded bores 22 in the peripheral casing edge 18 that extends along the side walls 12—13 of the handle shank or casing body 11 and semi-circular ends 14—19, thereby enclosing the chamber 16 and confining the torsion displacing, indicating, and measuring instrumentalities to be described hereinafter. It will be noted that the handle shank or casing body 11 and especially the inclined side walls 12—13 are reinforced in the region of the threaded bores 22 by increasing the thickness of the cast peripheral flange 18 as at 23—24, 25—26 and 27—28 so that the comparatively rigid and load carrying cover plate 17 can be effectively attached to the casing body 11 which is greatly strengthened and reinforced therewith.

In fact, the casing 11 does not sustain any appreciable turning load and primarily serves to confine the measuring instrumentalities as a protection against foreign substances and impacts. The cover plate 17 is sufficiently rigid to avoid a flex, distortion or consequential variation under turning load. The semi-circular head 14 of the body 11 is provided with a circular recess 29 corresponding substantially in curvature therewith and sized to receive a revoluble turning member 30 of substantially corresponding size for free rotation therein. The revoluble turning member 30 has an annular shoulder 31 formed, in this instance, integral therewith immediately above a polygonal wrench socket receiving extremity 32 which terminates beyond the bottom 15 of the casing shank 11 for projecting through the circular recess 29 provided in the head 14. A spring impelled detent 33 of standard construction is provided in a face of the polygonal shank 32 for cooperation with a correspondingly sized and shaped recess provided in a wrench socket or other turning implement that is telescoped thereon for retention thereon against accidental detachment.

Wrench sockets or other turning implements (not shown) would normally be provided with a recessed shank shaped and sized to conform with the polygonal extremity 32 of the revoluble turning member 30 so that the friction exerted by the spring impelled detent 33 would be effective in retaining the turning implement thereon against accidental removal. As shown, the revoluble member 30 has a cylindrical extension 34 constituting a turning shank which, in this instance, is formed integral with the annular shoulder 31 and polygonal shank 32 in axial relation therewith. The cylindrical turning shank 34 terminates for contact at its base extremity 35 with the interior head portion surface 36 of the steel cover plate 17 for welded joinder therewith as at 37 around the circumference 38 of the base extremity 35 of the turning shank 34. This rigidly anchors and attaches the turning shank 34 to the cover plate 17 so that they operate as a single fixed member. The head portion 36 of the cover plate 17 has a semi-circular extremity 39 that conforms in size and shape with the semi-circular extremity 40 of the casing 11.

With this arrangement, the turning member 30 projects through the chamber 16 of the body shank 11 so that the polygonal extremity 32 will be exteriorly accessible beyond the casing bottom 15 for engagement and disengagement with turning members such as wrench sockets and the like. It should be noted that the revoluble turning member 30 is rigidly attached to the cover plate 17 that is preferably of rigid and non-yielding material such as steel while the body or casing shank 11 may be cast or otherwise shaped from aluminum in that the revoluble turning member 30 is mounted for movement relative thereto in sustaining the turning load. The casing 11 does not directly carry any appreciable load. Turning movement is imparted to a fastener such as a threaded nut through a wrench socket attached to the polygonal shank 32 of the revoluble turning member 30, responsive to manually applying force or effort to the handle 10 in one direction or another.

In order to measure the extent to which any fastener such as a threaded nut is applied through the manipulation of the handle 10, the extent of twist sustained by the cylindrical extension 34 of the revoluble turning member 30 is determined in that this will be uniform for any predetermined applied force and will vary proportionately to the turning load imparted through the handle 10 that is primarily sustained by the rigid cover plate 17. It will be observed that any turning movement applied to the handle 10 will be transferred to the cover plate 17 which, in turn, will rotarily displace the revoluble turning member 30 which carries a nut or other turning implement to the end that proportional twist is imparted to the cylindrical extension 34 anchored to the cover plate 17 at one extremity 35 and free to twist at the other extremity 32 responsive to carrying the turning load.

In order to measure the degree of twist or torsion imparted to the cylindrical extension 34 of the revoluble member 30 responsive to any turning operation, an elongated measuring instrument actuator 41 projects radially from the turning shank shoulder 31. The actuator 41 comprises, in this instance, an angular branched member having divergent arms 42—43 which terminate in a tubular shank 44 (Figure 10). The actuator 41 is preferably though not essentially stamped from sheet material to present angular cross-sectional arms 42—43 for rigidity and lightness, and these divergent arms terminate in extremities 45—45' complemental to the shank shoulder 31 (Figure 4) for welded attachment thereto and fixed engagement to constitute a single acting unit or member therewith.

The actuator shank 44 is fixed to a rod 46 that projects longitudinally of the body or casing shank 11 for confinement therein. So that the casing shank 11 together with its associated instrumentalities may be as compact as possible, the cylindrical indicator displacing rod 46 is preferably disposed in the plane of the forked actuator 41 (Figure 8) to avoid contact with either the bottom 15 or cover plate 17 and free to circumferentially move or oscillate for a limited extent depending upon the degree of twist imparted to the revoluble member extension 34 or the torsion effect therein responsive to carrying the turning load relative to the cover plate 17. This forked angular actuator 41 is light but rigid and balances the instrumentalities symmetrically of the load carrying shank shoulder 31 so as to avoid any flex therein irrespective of the position of the casing handle 10 and that of the cover plate 17.

The elongated indicator displacing actuator 41 and rod 46 need only be heavy enough to overcome the friction in the measuring instrumentalities and the load occasioned by their operation without causing any flex therein by its own weight or in translating the torsional displacement of the load carrying shank 31. Its thickness and diametrical size, however, may be determined by other factors such as the elimination of backlash and conditions of abuse in actual nut turning operations. For that reason, the elongated forked actuator 41 and rod 46 in actual practice may be somewhat heavier than otherwise required merely to carry a comparatively negligible load of operating the measuring instrumentalities without any flex therein; therefore the angular cross-sectional construction of the forked actuator is thought to be highly advantageous.

It may be more desirable from a manufacturing standpoint to terminate the elongated cylindrical rod 46 just short of a lower circular handle extremity 50 of the cover plate 17 and join therewith a rod extension 51 of comparatively smaller diameter. To this end, the rod extension 51 has its upper extremity 52 projecting within an axial bore 53 provided in the lower extremity of the rod 46. The upper extremity 52 of the rod extension 51 is frictionally engaged in the bore 53 by means of a tapered tightening nut 54 that threadedly engages a correspondingly tapered and lower extremity 55 of the rod 46 to effect rigid connection of the rod extension 51 with the elongated cylindrical actuating rod 46 for the measuring instrumentalities (Figure 11). The lower extremity 49 of the rod 46 is provided with longitudinal slits 49' in the region of the axial bore 53 to provide the desired contractual resiliency responsive to tightening the nut 54.

With this arrangement, the rod extension 51 may be extended or retracted within the axial bore 53 of the rod 46 to enable longitudinal adjustment of the rod extension 51 relative to the indicator mechanism fully disclosed and described in the aforesaid Letters Patent issued to applicant and to be hereinafter briefly described. The longitudinal adjustment of the rod extension 51 will vary the extent to which the dial mechanism is actuated or displaced responsive to a predetermined torsional stress imparted to the shank 34 of the work engaging member 33. This enables also the replacement of the rod extension 51 should occasion demand or should such become impaired in any nut turning operation. It should be noted that the rod extension 51 is of a comparatively small diameter so that it will be highly flexible to protect the delicate indicator mechanism in the event of back lash caused by the sudden manual release of the handle grip 10. The flexibility of the rod extension 51 will enable it to readily yield in order to absorb the recoiling force of the load rather than have the indicator mechanism subject thereto should the load be accidentally or unintentionally released abruptly. It should be noted that the rod 46 together with its extension 51 functions exactly the same even though these were turned or otherwise shaped to constitute an integral unit; however, such construction would be somewhat more expensive from a production standpoint than the co-axial connected rods 46—51 serving as an actuator for measuring instrumentalities when displaced by the twist imparted to the turning member shank 34.

The reduced rod extension 51 has a right angularly offset extremity 56 which projects transversely within the casing body chamber 16 near the bottom end thereof for registry in a longitudinally elongated slot 57 provided in a lever 58 that comprises a part of measuring and indicating instrumentalities to be presently described. The lever 58 is secured at one extremity thereof to a stub shaft 59 that carries a gear sector 60. The stub shaft 59 is journalled in a substantially T-shaped bracket 61 that is mounted by means of threaded studs 62, in this instance three, to a circular dial casing plate 63.

The gear sector 60 meshes with a pinion 64 mounted on a stud shaft 65 journalled between the substantially T-shaped bracket 61 and the dial casing plate 63. The pinion stud shaft 65 projects through the dial casing plate 63 to carry an indicator pointer 66 attached thereto to confront an exterior surface of the dial plate 63. The dial casing plate 63 has a calibrated dial 67 attached thereto to designate in foot pounds the degree of twist or torsional effect exerted on the revoluble turning extension 34 in fastening a nut or other expedients by proper engaging attachment with the polygonal shank 32 while the manual force is applied to the handle 10. It should be observed that the offset extremity 56 of the rod extension 51 will be displaced within the elongated slot 57 of the dial mechanism lever 58 responsive to longitudinally adjusting the rod extension 51 relative to the rod 46. This variation in the position of the rod extension offset extremity 56 within the slot 57 of the lever 58, will enable the correct setting or resetting of the dial mechanism for any particular load. This will readily insure accuracy by the simple adjustment and positioning of the rod extension 51 relative to the rod 46, and indicate the nut turning torque load as is more fully illustrated and described in United States Letters Patent No. 2,367,224 dated January 16, 1945.

The calibrated dial 67 is confined within a narrow dial ring 68 which cooperates with the dial casing plate 63 to constitute an exterior confining member for the pinion shaft 65, the indicator pointer 66 and the calibrated dial 67. A suitable transparent dial cover 69 is secured to the dial casing ring 68 to confine and serve as protection for the dial indicator 66 and the calibrated dial 67. The starting position of the dial indicator 66 may be set relative to a pin 70 serving as a stop that is anchored in the dial casing plate 63 to project through the calibrated dial 67. With the use of the dial stop 70, the indicator 66 can be returned to its initial position after each operation or reading. To measure the torque in the opposite direction that would ordinarily cause the indicator or pointer 66 to be obstructed by the pin 70, the casing ring 68 and dial 69 are rotated to bring the pin 70 in engagement with the opposite edge of the pointer 66 which recedes from the pin 70 after this change in dial position has been effected.

The measuring instrumentalities described herein are returned to their initial position after the revoluble turning member 30 has been released from its load or nut turning operation, by means of a small spiral spring 71 that envelops the pinion and indicator carrying shaft 65 to normally urge or return the indicator instrumentalities to initial position. It should be noted that the angularly offset extremity 56 is maintained in registry with the slot 57 of the lever 58 by means of a substantially U-shaped wire retainer bracket 72 that is anchored at its extremity by means of tabs 73—74 anchored to the underside of the cover plate 17 (Figure 7) to maintain the actuator rod 46 and its extension 51 in operating connection with the measuring instrumentalities.

The measuring instrumentalities which are assembled as a unit to the dial casing plate 63 are attached to the exterior surface of the lower circular extremity 50 of the cover plate 17 which is provided, in this instance, with a pair of apertures 75—76 for receiving threaded studs therethrough to engage correspondingly spaced and threaded apertures (not shown) provided in the casing plate 63. Consequently, measuring and indicator mechanism can be attached to the cover plate 17 together with the revoluble member 30 and its torsion displacing actuator 41 and rods 46—51. The cover plate 17 together with these instrumentalities are, in turn, attached for confinement in the chamber 16 of the body or casing shank 11 by means of fasteners such as the threaded studs 20.

It should be observed that the lower end of the chamber 16 of the body casing 11 is outwardly flared to define a circularly flared configuration 77 to conform with the size and shape of the lower extremity 50 of the cover plate 17 together with the dial casing plate 63 and its confronting ring 68. It will be apparent from the foregoing arrangement of parts that a manual turning force applied to the handle 10 will impart a corresponding turning effect to the revoluble turning member 30. This creates a slight twist in the turning member extension or shank 34 which can be measured with the advantage procured through the moment arm dial indicator displacing member 46 therebetween.

This turning operation is transmitted to a suitable fastener or tool or implement or fastener such as a threaded nut which require a predetermined turning load in securing it to the desired degree of tightness for the suitable performance of its intended function. This turning movement and sustained turning load will create a fractional twist in the revoluble member shank or extension 34 between its annular shoulder 31 and the polygonal stationary shoulder 35. This fractional twist created by the torsional effect on the cylindrical extension 34, will be translated to the measuring instrumentalities culminating in the rotary displacement of the pointer 66 relative to the calibrated dial 67 through the medium of the elongated rods 46—51. The degree of twist or torsional strain within the turning member shank 34 is measured at the extreme end of the elongated rods 46—51 which is the point of its greatest displacement.

As a result, the rod 46—51 will accentuate the twist created in the revoluble head extension 34 to effect its return to the indicator pointer to an extent proportional to the length of the elongated rods 46—51. The measurement of the twist imparted to the revoluble head extension 34 at a point of maximum displacement of the comparatively long twist-translating rods 46—51 is an important factor in producing accurate readings. Then, too, the rods 46—51 need only be heavy enough to overcome the comparatively negligible force required to actuate the measuring instrumentalities so that comparatively little friction is encountered between the revoluble turning member 30 and the measuring instrumentalities. This is conducive to accuracy accomplished with utmost simplicity in construction and operation.

With the arrangement of parts above described, the rods 46—51 comprising a single or sectional member is of such flexibility as to preclude injury to the dial mechanism in the event the handle 10 is abruptly released or the turning load should fall by virtue of a rupture in the nut or bolt or other instrumentality that is being tightened. The rather flexible rods 46—51 would absorb a substantial part of the shock without permitting such to damage the dial mechanism or any part thereof under abnormal conditions of abrupt release. Then, too, the pointer 66 is frictionally mounted on the stud shaft 65 for rotation relative to or therewith.

This enables resetting of the dial indicator pointer 66 relative to the pin 70 prior to applying a wrench to an instrumentality that is to be turned therewith. Any abrupt release of the nut turning load even through the comparatively flexible rods 46—51 would be unable to absorb the entire shock owing to backlash, would result in the pointer 66 striking the pin 70 and allowing the pinion stud shaft 65 to be rotatively displaced relative to the pointer 66 without injury thereto in the elongated dial actuator rods 46—51. Any back-lash occasioned by the abrupt accidental release of the turning load would ordinarily jar, impair and render permanently defective the measuring instrumentalities.

This can be largely overcome by the actuator rod extension 51 which is highly flexible, resilient and possessed of only sufficient rigidity to overcome the measuring instrumentalities connected thereto. Consequently, the severe stress and strains resulting from any back-lash action, will be absorbed for the most part by the flexing of the actuator rod extension 51 and thus protect the measuring instrumentalities in any type of beam device under such abnormal conditions of abusive operation. The steel spring wire 51 is sufficiently rigid to carry the comparatively small load involved in actuating the indicator instrumentalities without any flex therein and yet sufficiently resilient to absorb any shock created in the abnormal operation of the turning head or revoluble member 30.

Then, too, the torsional displacement in a torsion-type wrench embodying a comparatively short load turning shank 34, is comparatively small in that the degree of twist therein would be a minute amount approximating five thousandths of an inch under normal loads. Because the elongated actuator 41 and adjustable rods 46—51 actuate the dial mechanism at its (rods 46—51) point of maximum displacement, this minute torsional displacement of the load carrying shank 34 is appreciably translated and accentuated at the dial end of the actuator rods 46—51. Even though there was an abrupt release of load, therefore, the back-lash in the aforesaid structure would be negligible and the actuator rods 46—51 would not be called upon to withstand any appreciable back-lash shock which could, however, be absorbed by the resilient actuator extension 51 which is preferably constructed from small diameter spring steel wire.

With the arrangement of parts above described, it will be apparent that a very simple, inexpensive and highly accurate torque measuring wrench has been provided wherein there are few moving parts and the friction thereof has been reduced to a minimum to preclude variable and inaccurate readings. These features coupled with the fact that the torsional stress created by the turning load is measured at the point of maximum displacement of the elongated dial mechanism actuator and rods (41, 46, 51) eliminates or reduces to a negligible minimum any inaccuracies even at small loads.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a torque wrench, the combination with an elongated handle member, of a torsion resisting work engaging head member anchored substantially normal to said handle member, said handle member and torsion resisting work engaging member being in rigid load turning connected relation, a bifurcated elongated torsion translating member having spaced arms rigidly anchored at their extremities to said head member in a plane spaced from the plane of attachment of said handle member to said head member, said bifurcated elongated torsion translating member extending freely along and substantially parallel to said handle member without connection therewith nor sustaining the work resisting load of said head member, and calibrated indicating means on said handle member for operative connection to the convergent end extremity of said bifurcated elongated member spaced arms to measure the torsion imparted to said head member and translated thereto by said bifurcated elongated torsion translating member responsive to sustaining a turning load with a turning force applied to said handle member.

2. In a torque wrench, the combination with an elongated handle member, of a torsion resisting work engaging head member anchored substantially normal to said handle member, said handle member and torsion resisting work engaging member being in rigid load turning connected relation, a bifurcated elongated torsion translating member having spaced divergent arms rigidly anchored at their extremities to said head member in a plane spaced from the plane of attachment of said handle member to said head member, said bifurcated elongated torsion translating member extending freely along and substantially parallel to said handle member without connection therewith nor sustaining the work resisting load of said head member, and calibrated indicating means on said handle member for operative connection to the convergent end extremity of said bifurcated elongated member spaced arms to measure the torsion imparted to said head member and translated thereto by said bifurcated elongated torsion translating member responsive to sustaining a turning load with a turning force applied to said handle member.

3. In a torque wrench, the combination with an elongated handle member, of a torsion resisting work engaging head member anchored substantially normal to said handle member, said handle member and torsion resisting work engaging member being in rigid load turning connected relation, a bifurcated elongated torsion translating member having spaced divergent light weight arms of stiff angular cross section rigidly anchored at their extremities to said head member in a plane spaced from the plane of attachment of said handle member to said head member, said bifurcated elongated torsion translating member extending freely along and substantially parallel to said handle member without connection therewith nor sustaining the work resisting load of said head member, and calibrated indicating means on said handle member for operative connection to the other extremity of said bifurcated elongated member spaced arms to measure the torsion imparted to said head member and translated thereto by said bifurcated elongated torsion translating member responsive to sustaining a turning load with a turning force applied to said handle member.

4. In a torque wrench, the combination with an elongated handle member, of a torsion resisting work engaging head member anchored substantially normal to said handle member, said handle member and torsion resisting work engaging member being in rigid load turning connected relation, a bifurcated elongated torsion translating member having spaced arms rigidly anchored at their extremities to said head member in a plane spaced from the plane of attachment of said handle member to said head member, said bifurcated elongated torsion translating member extending freely along and substantially parallel to said handle member without connection therewith nor sustaining the work resisting load of said head member, a highly flexible rod extension operatively connected to the free extremity of said bifurcated elongated torsion translating member, and calibrated indicating means on said handle member for operative connection to the other extremity of said rod extension to measure the torsion imparted to said head member and translated thereto by said bifurcated elongated torsion translating member responsive to sustaining a turning load with a turning force applied to said handle member.

5. In a torque wrench, the combination with an elongated handle member, of a torsion resisting work engaging head member anchored substantially normal to said handle member, said handle member and torsion resisting work engaging member being in rigid load turning connected relation, a substantially Y-shaped torsion translating member having spaced arms rigidly anchored at their extremities to said head member in a plane spaced from the plane of attachment of said handle member to said head member, said bifurcated elongated torsion translating member extending freely along and substantially parallel to said handle member without connection therewith nor sustaining the work resisting load of said head member, a highly flexible rod extension adjustably connected to the free convergent end extremity of said substantially Y-shaped torsion translating member, and calibrated indicating means fixed to the other extremity of said handle member for operative connection to the free extremity of said rod extension to measure the torsion imparted to said head member responsive to sustaining a turning load with a turning force applied to said handle member.

6. In a torque wrench, the combination with an elongated handle member, of a torsion resisting work engaging head member anchored substantially normal to said handle member, said handle member and torsion resisting work engaging member being in rigid load turning connected relation, a peripheral shoulder on said work engaging head member, a substantially Y-shaped torsion translating member having spaced arms rigidly anchored at their extremities to the peripheral shoulder of said head member in a plane spaced from the plane of attachment of said handle member to said head member, said bifurcated elongated torsion translating member extending freely along and substantially parallel to said handle member without connection therewith nor sustaining the work resisting load of said head member, a highly flexible rod extension adjustably connected to the free convergent end extremity of said substantially Y-shaped torsion translating member, and calibrated indicating means fixed to the other extremity of said handle member for operative connection to the free extremity of said rod extension to measure the torsion imparted to said head member responsive to sustaining a turning load with a turning force applied to said handle member.

References Cited in the file of this patent

UNITED STATES PATENTS

| | | |
|---|---|---|
| 2,343,380 | Larson et al. | Mar. 7, 1944 |
| 2,374,217 | Larson et al. | Apr. 24, 1945 |
| 2,392,702 | Saunders | Jan. 8, 1946 |

FOREIGN PATENTS

| | | |
|---|---|---|
| 858,045 | France | May 6, 1940 |